United States Patent [19]
Karell

[11] Patent Number: 5,937,737
[45] Date of Patent: Aug. 17, 1999

[54] PERSONAL BREWING FILTER DEVICE FOR COFFEE, TEA AND OTHER BREWABLE BEVERAGES

[76] Inventor: Manuel Leon Karell, 3573-22 St., San Francisco, Calif. 94114

[21] Appl. No.: 08/810,478

[22] Filed: Mar. 1, 1997

Related U.S. Application Data

[60] Provisional application No. 60/015,660, Apr. 19, 1996.
[51] Int. Cl.[6] ............................. A47J 31/01; B65B 29/02
[52] U.S. Cl. .................. 99/287; 99/323; 99/279; 99/299; 426/80; 426/82
[58] Field of Search ................... 99/279, 287, 295, 99/299, 306, 323, 304; 426/433, 80, 82

[56] References Cited

U.S. PATENT DOCUMENTS

| | | | |
|---|---|---|---|
| 2,800,408 | 7/1957 | Fimple | 99/295 X |
| 2,986,269 | 5/1961 | Goldberg | 426/80 |
| 4,086,848 | 5/1978 | Hahn | 99/323 |
| 4,306,492 | 12/1981 | Zimmermann | 99/287 |
| 4,688,479 | 8/1987 | Cunningham | 99/323 X |
| 4,948,601 | 8/1990 | Serbu | 426/82 |
| 4,977,820 | 12/1990 | Lin | 99/323 |
| 4,981,588 | 1/1991 | Poulallion | 99/295 X |
| 5,031,517 | 7/1991 | Yeh | 99/319 |
| 5,171,457 | 12/1992 | Acuff et al. | 210/800 |
| 5,277,103 | 1/1994 | Cox | 99/323 |
| 5,325,765 | 7/1994 | Sylvan et al. | 99/295 |
| 5,424,083 | 6/1995 | Lozito | 426/82 |
| 5,440,972 | 8/1995 | English | 99/282 |
| 5,441,752 | 8/1995 | Sandin | 426/80 X |
| 5,605,710 | 2/1997 | Pridonoff et al. | 99/306 X |
| 5,620,724 | 4/1997 | Adler | 426/80 X |

*Primary Examiner*—Reginald L. Alexander

[57] ABSTRACT

The Personal Brewing Filter Device For Coffee, Tea and Other Brewable Beverages comprises a disposable filter device having a member to confine and a member to compress coffee grounds or tea leaves within the filter device. This enables controlled brewing while the device remains within the cup. The device may be permanently configured as a frame within a cup, or the device may be configured so as to have a rigid frame to be portable from cup to cup, using available disposable filters or single serving coffee or tea bags.

18 Claims, 6 Drawing Sheets

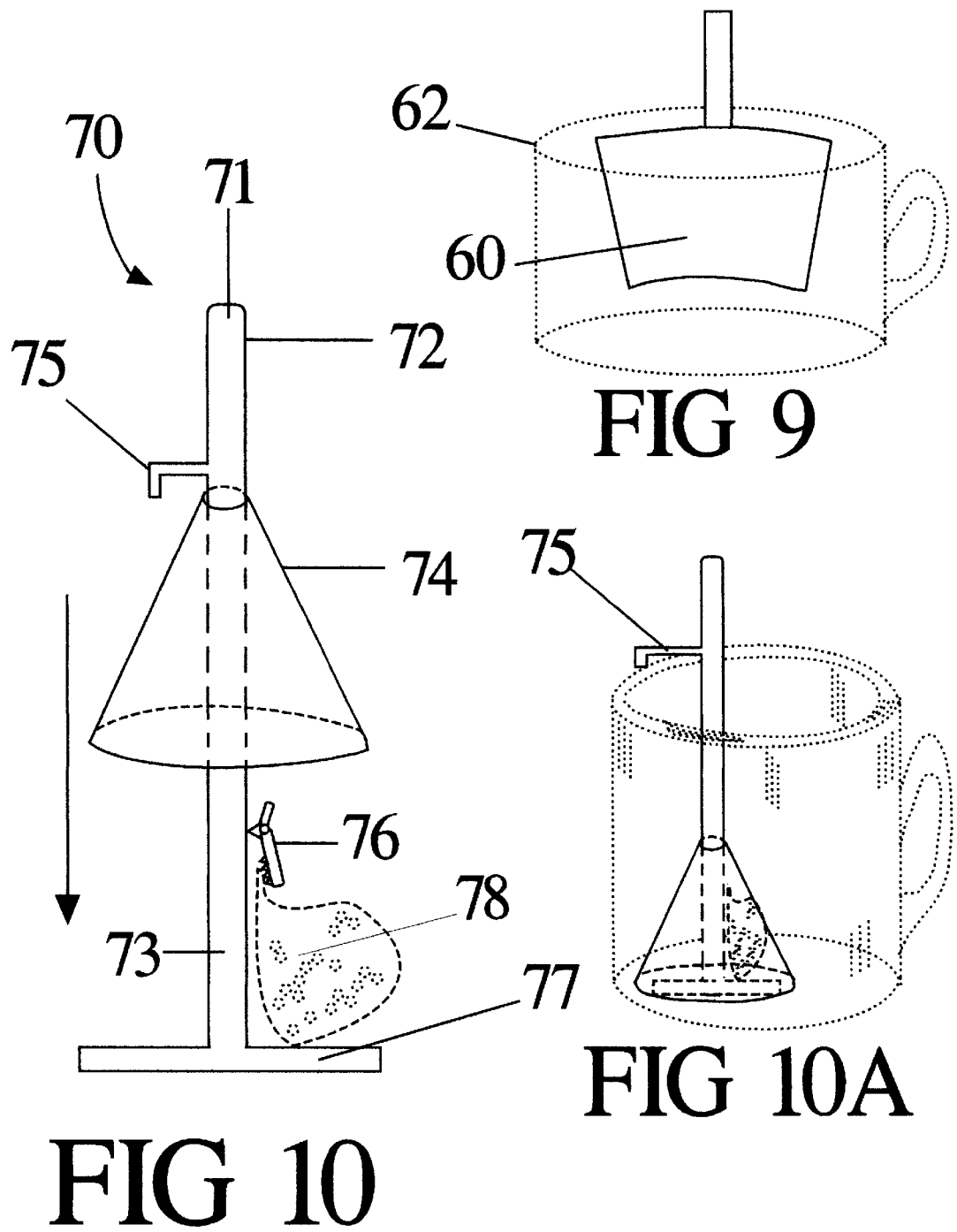

PERSONAL BREWING FILTER DEVICE FOR COFFEE, TEA AND OTHER BREWABLE BEVERAGES

This application claims the benefit of U.S. Provisional Application, No. 60/015,650, filed Apr. 19, 1996.

BACKGROUND AND SUMMARY OF THE INVENTION

This invention relates to household items and more particular to a personal brewing device for use in brewing individual servings of coffee, or tea, or other beverages.

Although coffee and tea has traditionally been brewed by the pot, there is prior art for personal brewers. U.S. Pat. No. 5,277,103 to Cox, 1994, includes a coffee containing pouch and a method for holding same. U.S. Pat. No. 4,306,492 to Zimmermann, 1981, and U.S. Pat. No. 4,086,848 to Hahn, 1978 include methods of coffee press brewing. U.S. Pat. No. 5,424,083 to Lozito, 1995 shows a self contained disposable coffee brewing cone. U.S. Pat. No. 5,031,517 to Yeh, 1991 shows a combined cover and strainer assembly for brewing coffee or tea. U.S. Pat. No. 5,171,457 to Acuff, 1992, shows a method for retaining coffee grounds within a filter. U.S. Pat. No. 5,325,765 to Sylvan, 1994 shows a filter cartridge use in coffee brewing. U.S. Pat. No. 5,605,710 to Pridonoff, 1997, teaches a heat sealed or sonically welded envelop of filter material containing therein coffee but does not teach a device which allows for the individual's choice of coffee grounds. U.S. Pat. No. 4,688,479 to Cunningham, 1987 teaches a means to compress a tea bag but lacks a filterable pouch. U.S. Pat. No. 4,981,588 to Poulallion, 1991 teaches a device that includes supporting members. Other devices for brewing include U.S. Pat. No. 4,948,601 to Serbu, 1990, U.S. Pat. No. 4,977,820 to Lin, 1990, and U.S. Pat. No. 5,440,972 to English, 1995.

What is needed is a way to brew individual portions of fresh coffee or tea or other substances in a completely disposable manner, while at the same time, controlling brewing. Also needed is a device whereupon the user does not have to wait and stand around while pouring water into a drip system while brewing to occurs. Also, after using a standard single coffee bag or tea bag to brew, or after using a drip filter, disposal of the wet grounds or tea leaves is a problematic. In addition, a method of decreasing the probability of spillage is needed.

The Personal Brewing Filter Device For Coffee, Tea and Other Brewable Beverages of the present invention meets these needs. The present invention allows coffee grounds to stay within the user's cup confined within a pouch with controlled brewing, does not require pouring and waiting while drip brewing, and allows for the disposal of wet coffee grounds at a convenient time. Additionally, this invention compresses the grounds or leaves, thereby decreasing the opportunity of spillage.

The user places his/her "gourmet" coffee grounds into the open top of a Personal Brewing Filter Device For Coffee, Tea and Other Brewable Beverages, activates the closure means within the top to make a closed pouch, places the device into a cup, pours hot water into the cup, adds milk if desired, places a special lid onto the cup and heads out the door or drives to work holding the assembly while the coffee brews. Attached to the filter pouch are compressors means for controlling brewing and attached to the compressors are handles for grasping. Tasting the liquid through the sipping hole provided, the user determines that the coffee has sufficiently brewed. He/she then pushes together the handles which were passed through the slit in the lid, thereby pushing together the compressors, thereby preventing liquid flowing though the grounds, thereby stopping the brewing. The coffee grounds remain confined within the filter pouch. The compressors have handles which fit through a slit in the lid. The handles have stabilizing protrusions keeping the device from falling through the slit into the cup. The handles remain together by fastening elements such as adhesive or magnets or electrostatic or mechanically engaging means. The vessel lid has a spill-proof slit and a sipping hole. After getting to the office, having consumed the coffee or tea, the user then discards the Personal Brewing Filter Device For Coffee, Tea and Other Brewable Beverages.

Generally, the Personal Brewing Filter Device For Coffee, Tea and Other Brewable Beverages of the present invention comprises a disposable filter device having the ability to make an open pouch into a closed pouch, while also having the ability to control brewing. It is sized to fit into a standard cup. A special lid may be used for portability.

Or the The Personal Brewing Filter Device For Coffee, Tea and Other Brewable Beverages may be configured as a rigid frame within a cup. Thus, the cup's wall acts as one compressor. A second compressor would be permanently attached to the cup and moveable, enabling compression of a conventional filter or filter bag which was inserted into the device for brewing. In this case only the standard filter or filter bag is discarded.

The Personal Brewing Filter Device For Coffee, Tea and Other Brewable Beverages can may be configured so as to have a rigid frame to be portable from cup to cup, using standard disposable filters or single serving coffee or tea bags. In this embodiment, there is a rigid frame having compressors, handles having stabilizers, and a holder means for holding a coffee bag securely and/or for securing and turning an open filter pouch into a closed filter pouch. An example of such a holder means may be a spring clamp attached to one of the compressors. The user takes a standard filter, inserts his/her coffee grounds, folds over or twists the top portion of the filter and then inserts the top into the clamp for securing the filter in position. He/she pours water into the cup, allows brewing to occur, and stops brewing by moving a compressor against another compressor.

A differently configured portable embodiment is a rod having a funnel-like compressor surrounding and slideable upon the rod. The rod also comprises a holding means for securing a filter bag and/or for making a standard filter into a closed pouch. The user secures the pouch containing coffee into the holding means and inserts the arrangement into a cup. He/she pours water into cup and when brewing is sufficient, slides the compressor down over the coffee bag, compressing the grounds and discontinuing brewing.

In general, the device can be shaped in many forms but the cone shape is preferred. Also, when made of microwave acceptable material, the device can be used in a microwave.

BRIEF DESCRIPTION OF DRAWINGS

FIG. 9 is a representation of a third embodiment in which a compressor is unitary with a cup.

FIGS. 10 and 10A are a representation of a fourth embodiment wherein a slideable compressor means surrounds a rod.

DETAILED DESCRIPTION OF THE PREFERRED EMBODIMENT(S)

Figure 1:
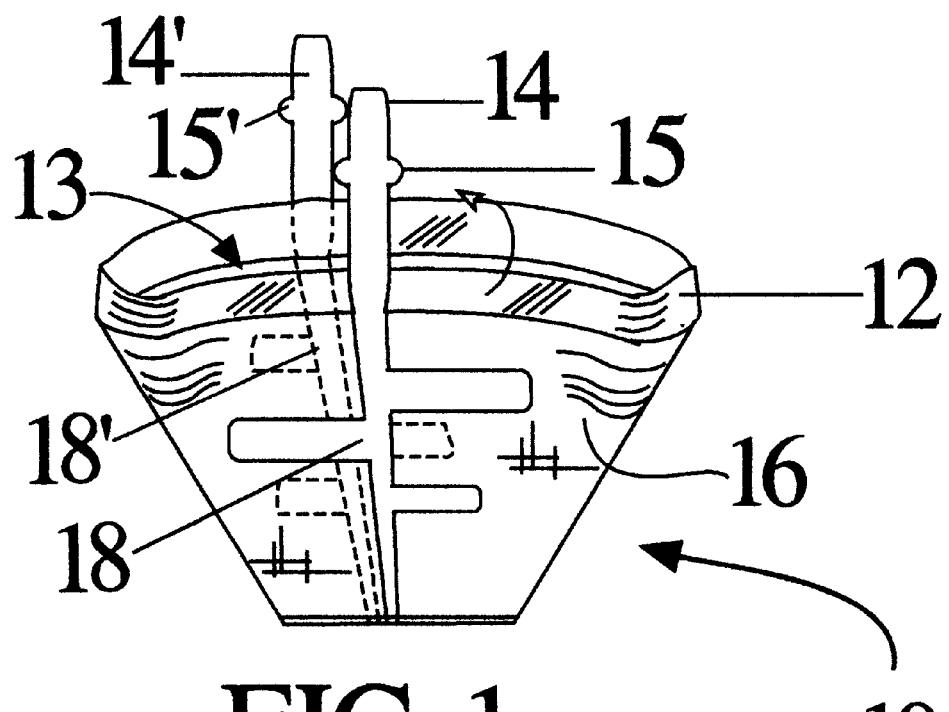
FIG. 1 is a representation of a Personal Brewing Filter Device For Coffee, Tea and Other Brewable in which a pouch has closed sidewalls, closed bottom and an open top, closure means, compressor means, handle means with stabilizing means.
Figure 2:
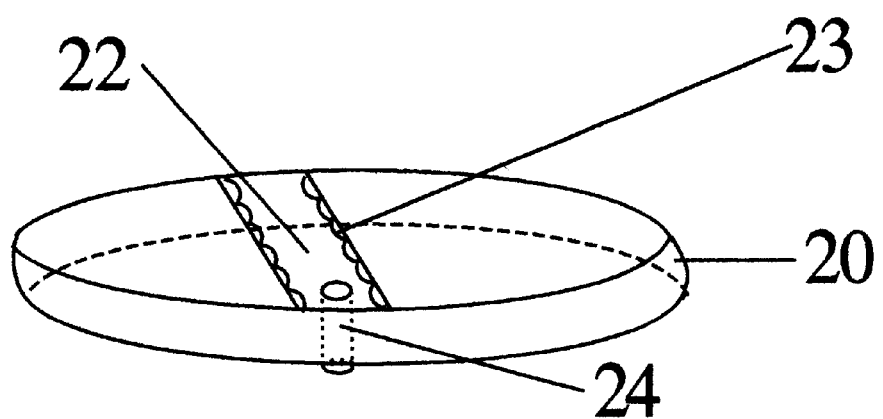
FIG. 2 is a representation of a vessel lid means having a spill-proof means within a slit means and sipping means.
Figure 3:
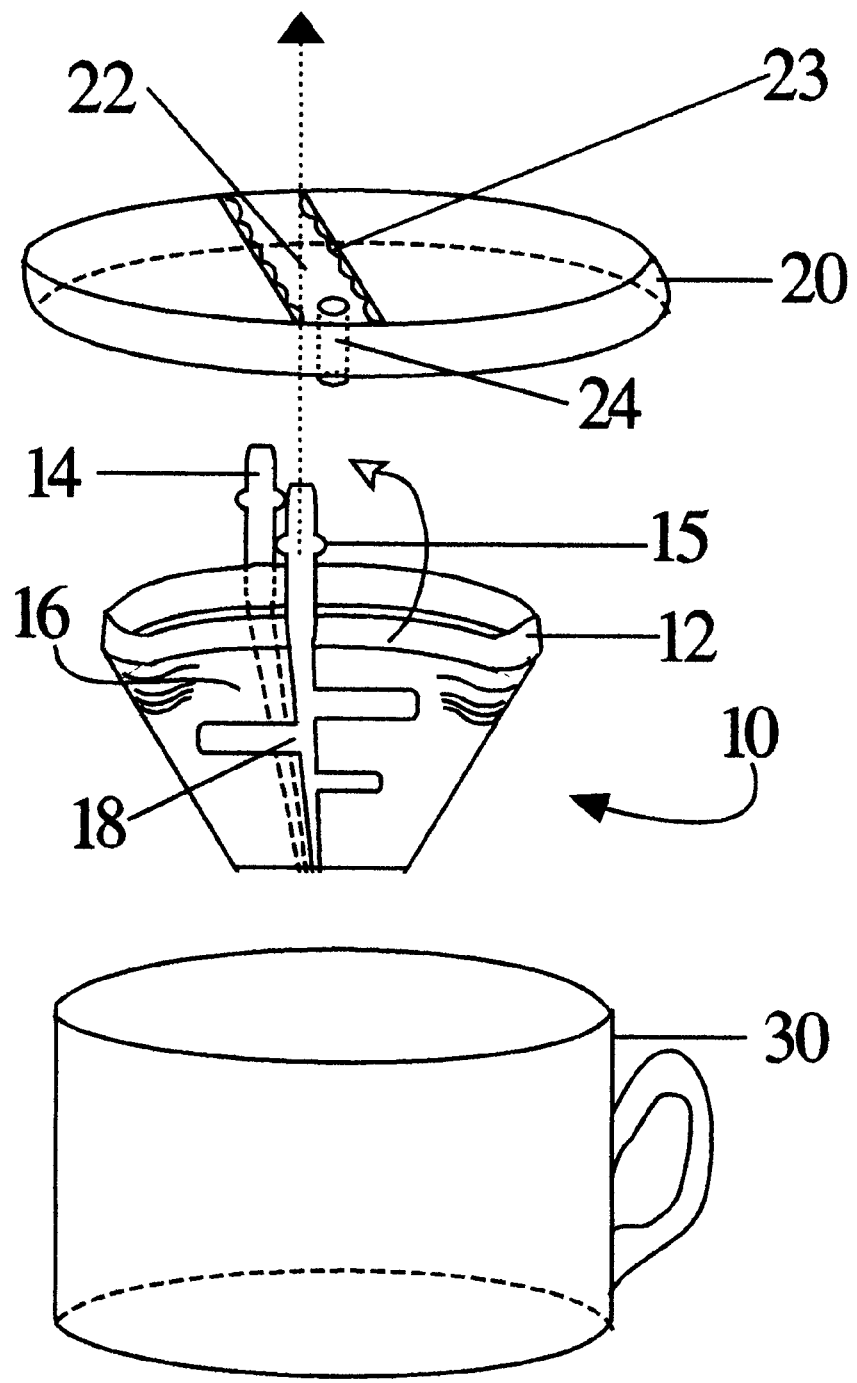
FIG. 3 is a general representation of the device fitting into a cup with lid being placed in position, with arrow showing how handles may be pushed through vessel lid slit.
Figure 4:
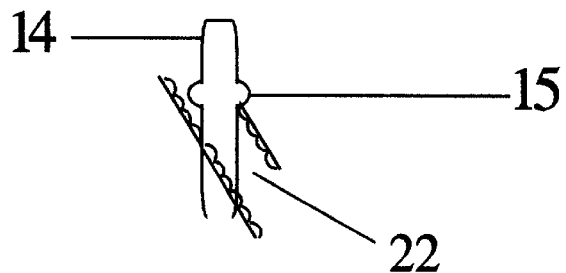
FIG. 4 is a close-up representation of the device handle means passing through the lid slit means.

A first embodiment of a Personal Brewing Filter Device For Coffee, Tea and Other Brewable Beverages constructed according to the principles of this invention is indicated generally as 10 in FIGS. 1 and 3. The device(10) comprises a liquid permeable pouch means(16) having closed sidewalls, a closed bottom, and an open top(13) which operatively includes a closure means(12) for closing open top(13) and converting the open filter pouch into a closed filter pouch. Operatively attached to pouch means(16) are one or more compressor means(18,18'), and one or more handle means(14,14'). Handle means(14,14') may also comprise a stabilizing means(15,15') for use with a vessel lid means(20). In conjunction with device(10) may be used a vessel lid mean(20)having a spill-proof means(23) within a slit means(22) and a sipping hole means(24). As can be seen in FIG. 3, the device(10) is sized to fit within a cup, vessel lid means(20) is sized to cover the cup tightly, and said handle means(14,14') is sized to fit through slit means(22). As is seen in FIG. 4, which is a close-up view of lid slit means(22), handle means(14) passes through slit means(22) and is held above the slit with stabilizing means(15).

Figure 5:
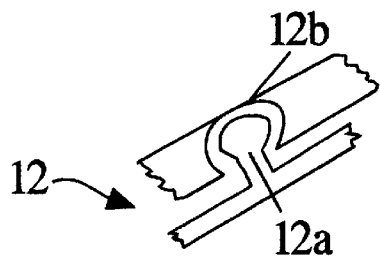
FIGS. 5, 5A, 5B, 5C are close-up representations of various closure means including adhesive, magnetic, electrostatic and mechanically engageable elements.
Figure 5A:
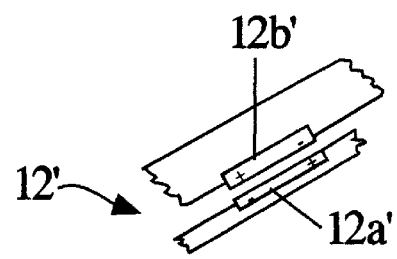
Figure 5B:
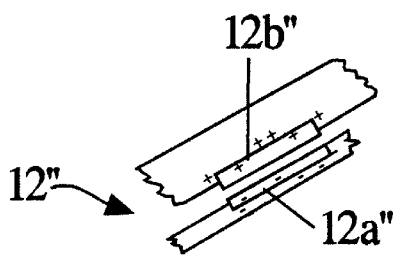
Figure 5C:
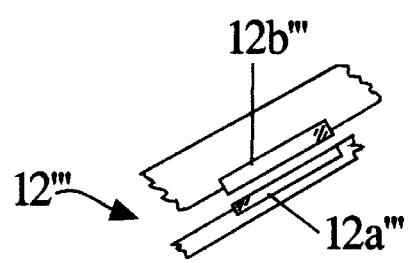
Figure 6:
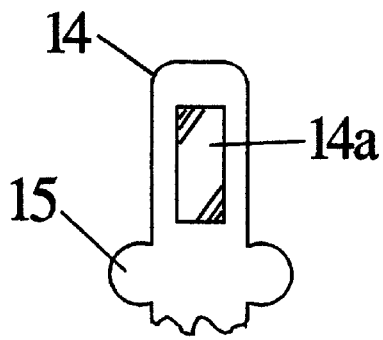
FIG. 6 is a close-up representation of an adhesive fastening means on handle having protruding stabilizing means.
Figure 6A:
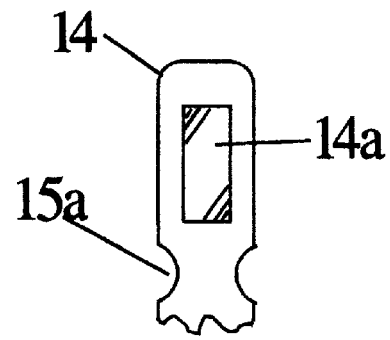
FIG. 6A is a close-up representation of an adhesive fastening means on handle having indented stabilizing means.
Figure 6B:
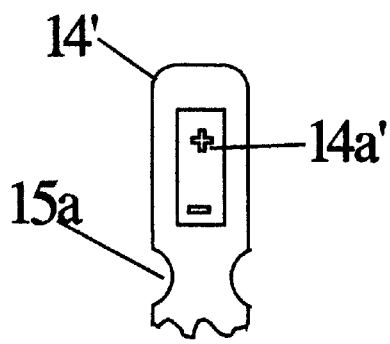
FIGS. 6B, 6C, 6D are close-up representations of various fastener means including, that of magnetic, electrostatic and mechanically engageable elements.
Figure 6C:
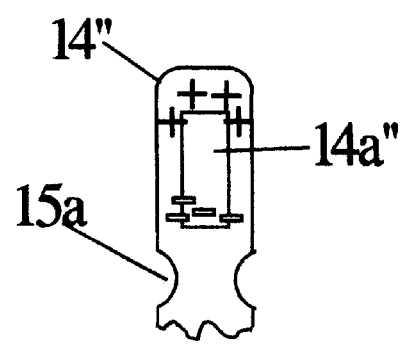
Figure 6D:
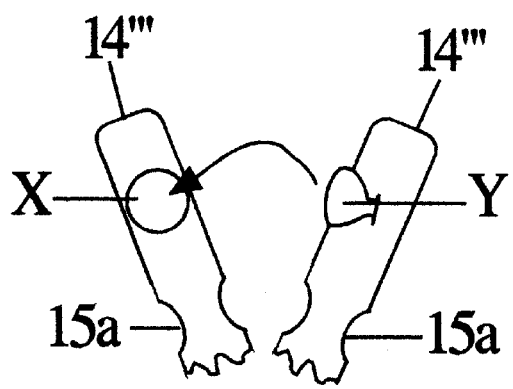
Figure 7:
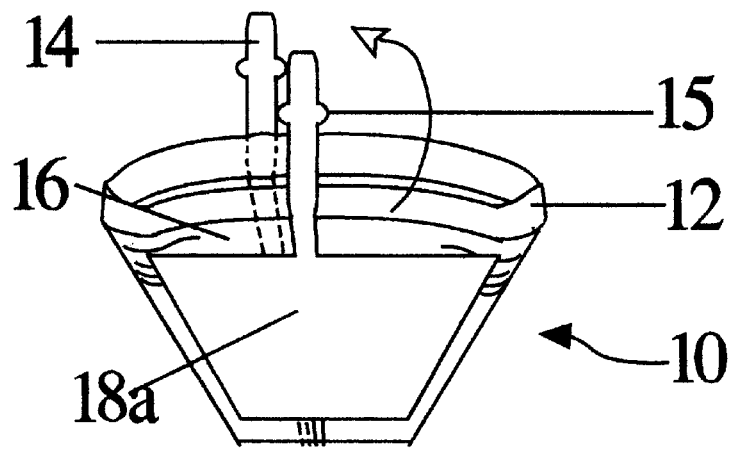
FIG. 7 is a representation of a solid compressor means.

FIG. 5 is a representation close-up view of an example of a pair of fastening elements engageable with each other of a mechanical method closure means(12) having a bulbous entity(12a) fitting into a cavernous entity(12b). FIG. 5A is a close-up view of magnetic closure means(12'). FIG. 5B is a close-up view of an electrostatic closure means(12"). FIG 5C is a close-up view of an adhesive closure means(12'''). FIG. 6 is a close-up view of handle means(14) having adhesive fastening means(14a). FIGS. 6B, 6C, 6D show various fastener element arrangements, including magnetic (14'), electrostatic(14"), and mechanical(14''') where, in FIG. 6D, element (Y) may be inserted into element(X). In addition, FIG. 6 shows stabilizing means(15) configured as protrusions, whereas, FIG. 6A shows stabilizing means(15a) configured as indentations. The closure means(12) and the fastening means(14a) may be of the class mechanical, electrostatic, magnetic or adhesive or other means. FIG. 7 shows a solid compressor means having the general shape of the sidewall of the pouch.

The user inserts coffee via open top(13) of Personal Brewing Filter Device For Coffee, Tea and Other Brewable Beverages and fills with the appropriate amount of coffee grounds. Then the closure means(12) is pressed together causing bulbous entity(12a) to snap into cavernous entity (12b) thereby producing a closed pouch, and thus confining the grounds within the filter pouch means(16). Filter pouch means is now a closed pouch. The device is inserted in to a cup and filled with hot water. The vessel lid means(20) is placed over the cup rim, while the handles(14,14') are passed through the lid's slit means(22), so that the stabilizer means (15,15') are fixed above the slit. The beverage brews. After brewing to desired taste as can be determined by tasting via the sipping hole(24), the compressor means(18,18') is moved to compress the coffee grounds thereby stopping the water from filtering through and thereby stopping brewing. The compressors are moved by the handles. The compressor means(18,18') are operatively attached to handles(14,14'), which remain fastened to each other via fastening means as seen in FIGS. 6–6D. The handles(14,14') additionally have stabilizing means(15,15'), such as protrusions, which prevent the handles and thus the device from falling into the cup. The user is capable of drinking his/her beverage while the device remains within the cup. Brewing has been halted to his/her taste. The device and wet grounds are disposed later at his/her convenience. If the user does not wish to use the vessel lid, all that is necessary is to place the filled, closed pouch into the water, swish it around until brewed, and bring the compressors together. Since the grounds are confined and compressed, there is less opportunity for spillage.

Figure 8:
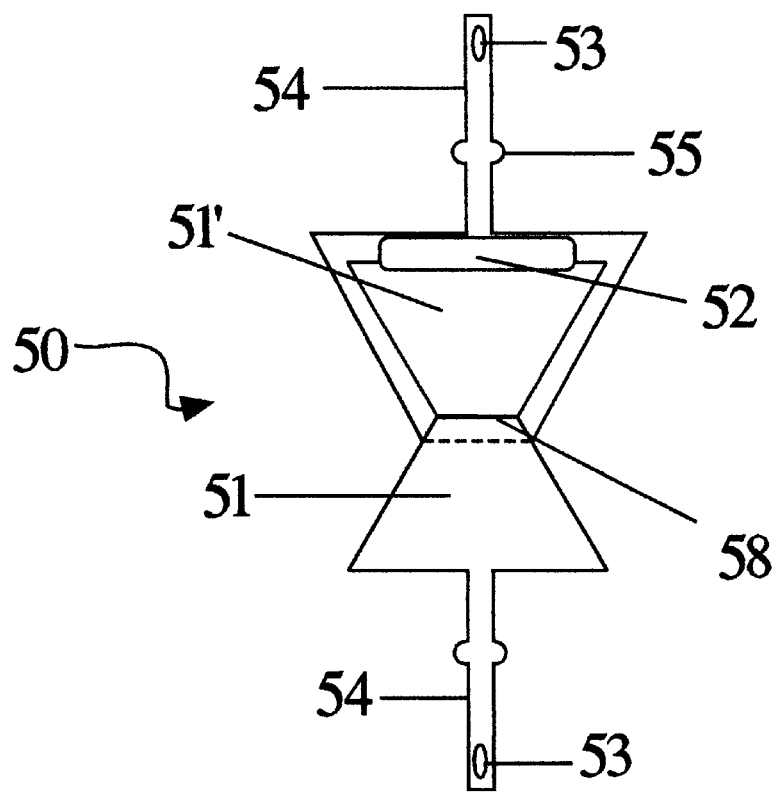
FIG. 8 is a representation of a second embodiment in which a rigid frame beverage brewing device comprises compressors having a filter pouch holding means.

A second embodiment of the Personal Brewing Filter Device For Coffee, Tea and Other Brewable Beverages is indicated generally as 50 in FIG. 8 and comprises two compressor means operatively connected together. Compressor means(51) is operatively connected through hinge (58) to compressor means(51'). A brewing bag holding means(52), such as spring loaded clip, is operatively connected to compressor means(51'). The compressor means operatively comprises handle means(54) having fastening means(53) and stabilizing means(55). This embodiment is portable from cup to cup and is configured as a rigid frame into which a coffee bag is inserted in the holder(52). The device with the coffee bag is inserted into the cup, hot water in poured in for brewing, after which the compressor means (51,51') are brought together. The device may be left within the cup. The user may use commercially available cone filters by folding or twisting the open top and placing it within the holder means(52) to confine the grounds within the filter. The vessel lid means(20) may also be used in this configuration.

A third embodiment of Personal Brewing Filter Device For Coffee, Tea and Other Brewable Beverages is indicated generally as 60 in FIG. 9. Device(60) is unitary and moveable with a cup(62). The compressor means is curved to conform to the shape of the cup and the cup wall acts as one of the compressor means. In this mode, only a coffee bag is discarded. The coffee bag is placed into the device, water is poured in and when brewed, the compressor means is moved compressing the coffee bag against the cup's wall. The vessel lid means(20) may also be use in this configuration.

A fourth embodiment of Personal Brewing Filter Device For Coffee, Tea and Other Brewable Beverages is indicated generally as numeral 70 in FIG. 10. A rod(71) has a proximal end(72) for grasping and a distal end(73) comprising a holding means(76), a slideable compression means(74), and a substantially perpendicular compression aid means(77). A brewing bag(78) filled with a brewing substance is held in place by holding means(76). Compression means(74), which may be shaped as a funnel, surrounds rod(71), is slideable along the rod's axis, and is capable of sliding distally over compression aid means(77) thereby compressing the bag to stop brewing. Additionally a stabilizing means(75), shown in FIGS. 10 and 10A, stabilizes the present embodiment on a cup's edge. Also shown in FIG. 10A is the compression means(74) slid distally to compress the brewing bag. In this fourth embodiment, the user secures a coffee bag onto distal end of rod(71) using the holder means(76), such as a spring clip. He/she then inserts the rod/coffee bag combination into the cup and pours hot water to brew. On completion of brewing the user then slides the compressor means(74) down over the coffee bag thereby compressing the coffee grounds, thereby stopping brewing. The compression aid means(77) further assists in compressing the grounds. In addition, this configuration may have a stabilizing means(75), such as hook and also may be pushed through a slit within a vessel lid means(20).

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

I claim:

1. A self contained, disposable, beverage brewing device comprising:

a liquid permeable pouch having closed sidewalls, a closed bottom, and an open top through which a brewing substance is inserted; wherein said open top operably includes a closure means for confining the brewing substance within said pouch; wherein said sidewalls have operably attached thereto at least one compressor means for compressing said sidewalls around the brewing substance for brew cessation; wherein said compressor means comprises at least one handle means operably attached thereto for holding and grasping; and wherein said handle means additionally comprises a fastener means selected from the group consisting of adhesive or magnetic or electrostatic or a pair of fastening elements engageable with each other for fastening said handles to each other.

2. A self contained, disposable, beverage brewing device comprising:

a liquid permeable pouch having closed sidewalls, a closed bottom, and an open top through which a brewing substance is inserted; wherein said open top operably includes an adhesive closure means for confining the brewing substance within said pouch; wherein said sidewalls have operably attached thereto at least one compressor means for compressing said sidewalls around the brewing substance for brew cessation; wherein said compressor means comprises at least one handle means attached thereto for holding and grasping; and wherein said handle means additionally comprises a fastener means selected from the group consisting of adhesive or magnetic or electrostatic or a pair of fastening elements engageable with each other for fastening said handles to each other.

3. A self contained, disposable, beverage brewing device comprising:

a liquid permeable pouch having closed sidewalls, a closed bottom, and an open top through which a brewing substance is inserted;

wherein said open top operatively includes a magnetic closure means for confining the brewing substance within said pouch; and wherein said sidewalls have operatively attached thereto at least one compressor means for compressing said sidewalls around the brewing substance for brew cessation; and wherein said compressor means comprises at least one handle means attached for holding and grasping.

4. A device of claim 3 wherein said handle means may additionally comprise a fastener means for fastening said handles to each other and wherein said fastening means may be selected from the group consisting of adhesive or magnetic or electrostatic or a pair of fastening elements engageable with each other.

5. A self contained, disposable, beverage brewing device comprising:

a liquid permeable pouch having closed sidewalls, a closed bottom, and an open top through which a brewing substance is inserted;

wherein said open top operatively includes an electrostatic closure means for confining the brewing substance within said pouch; and wherein said sidewalls have operatively attached thereto at least one compressor means for compressing said sidewalls around the brewing substance for brew cessation; and wherein said compressor means comprises at least one handle means attached for holding and grasping.

6. A device of claim 5 wherein said handle means may additionally comprise a fastener means for fastening said handles to each other and wherein said fastening means may be selected from the group consisting of adhesive or magnetic or electrostatic or a pair of fastening elements engageable with each other.

7. A self contained, disposable, beverage brewing device comprising:

a liquid permeable pouch having closed sidewalls, a closed bottom, and an open top through which a brewing substance is inserted; wherein said open top operably includes a pair of fastening elements engageable with each other for confining the brewing substance within said pouch;

wherein said sidewalls have operably attached thereto at least one compressor means for compressing said sidewalls around the brewing substance for brew cessation;

wherein said compressor means comprises at least one handle means attached thereto for holding and grasping;

and wherein said handle means additionally comprises a fastener means for fastening said handles to each other.

8. A self contained, disposable, beverage brewing device comprising:

a liquid permeable pouch having closed sidewalls, a closed bottom, and an open top through which a brewing substance is inserted;

wherein said open top operatively includes a closure means for confining the brewing substance within said pouch;

wherein said sidewalls have operatively attached thereto at least one compressor means for compressing said sidewalls around the brewing substance for brew cessation;

wherein said compressor means comprises at least one handle means attached superiorly for grasping; and wherein said self contained, disposable, beverage brewing device is used in conjunction with a vessel lid having a slit means for passing through said handles while fitting over a vessel and a sipping hole means for sipping brew while the vessel lid covers the vessel.

9. A device of claim 8 wherein said closure means may be selected from the group consisting of adhesive or magnetic or electrostatic or a pair of fastening elements engageable with each other.

10. A device of claim 8 wherein said handle means may additionally comprise a fastener means for fastening said handles to each other and wherein said fastening means may be selected from the group consisting of adhesive or magnetic or electrostatic or a pair of fastening elements engageable with each other.

11. A device of claim 8 wherein said handle means additionally comprises a stabilizing means for stabilizing said handle in relation to said spill-proof slit means.

12. A device of claim 11 wherein said stabilizing means are protrusions.

13. A device of claim 11 wherein said stabilizing means are indentations.

14. A rigid frame beverage brewing device comprising:

two compressor means, operatively connected together at their bottoms, for compressing a brewing substance within a liquid permeable filter pouch;

wherein each compressor means has a handle at their top for grasping;

wherein said handles additionally comprises a fastening means for fastening each handle together;

wherein each handle additionally comprising a stabilizing means for stabilizing said device in relation to a vessel and a vessel lid; and wherein one compressor additionally comprises a filter pouch holding means for securing and holding a filter pouch during compression with said two compressor means.

15. A device of claim 14 wherein said filter pouch holding means is a spring clamp.

16. A device of claim 14 wherein said fastener means may be selected from the group consisting of adhesive or magnetic or electrostatic or a pair of fastening elements engageable with each other.

17. A rigid frame beverage brewing device comprising two components:

(a) two compressor means operably hinged together for stopping brewing by compressing a brewing substance within a liquid permeable filter pouch; wherein each compressor means having operably attached thereto a handle for holding and grasping; wherein said handle additionally having operably attached thereto a stabilizing means for stabilizing said handle in relation to a vessel lid; wherein one of said two compressor means additionally comprises a filter pouch holding means for holding said liquid permeable filter pouch; and (b) a vessel lid for fitting over a vessel wherein said lid operably contains a slit means for passing through said handles.

18. A device of claim 17 wherein said holding means is a spring clamp.

* * * * *